United States Patent
Lee

(10) Patent No.: US 11,525,729 B2
(45) Date of Patent: Dec. 13, 2022

(54) PROJECTION DEVICE

(71) Applicants: LITE-ON OPTO TECHNOLOGY (CHANGZHOU) CO., LTD., Changzhou (CN); LITE-ON TECHNOLOGY CORPORATION, Taipei (TW)

(72) Inventor: Chia-Ming Lee, Tainan (TW)

(73) Assignees: LITE-ON OPTO TECHNOLOGY (CHANGZHOU) CO., LTD., Changzhou (CN); LITE-ON TECHNOLOGY CORPORATION, Taipei (TW)

( * ) Notice: Subject to any disclaimer, the term of this patent is extended or adjusted under 35 U.S.C. 154(b) by 134 days.

(21) Appl. No.: 17/095,745

(22) Filed: Nov. 12, 2020

(65) Prior Publication Data

US 2021/0149285 A1    May 20, 2021

Related U.S. Application Data

(60) Provisional application No. 62/935,671, filed on Nov. 15, 2019.

(30) Foreign Application Priority Data

Oct. 21, 2020    (CN) .......................... 202011135591.5

(51) Int. Cl.
*G03B 21/14*    (2006.01)
*G03B 21/26*    (2006.01)
(Continued)

(52) U.S. Cl.
CPC ................ *G01J 1/08* (2013.01); *F21V 5/007* (2013.01); *F21V 17/101* (2013.01); *G01J 1/0474* (2013.01); *G01J 1/42* (2013.01); *G03B 21/145* (2013.01); *G03B 21/26* (2013.01); *H05B 35/00* (2013.01); *F21K 9/90* (2013.01); *F21Y 2105/16* (2016.08); *F21Y 2113/10* (2016.08); *G03B 21/2033* (2013.01)

(58) Field of Classification Search
CPC ...... G03B 21/00; G03B 21/14; G03B 21/145; G03B 21/2033; G03B 21/16
USPC .................. 353/22–24, 40, 120, 100, 101
See application file for complete search history.

(56) References Cited

U.S. PATENT DOCUMENTS 3,544,208 A * 12/1970 Wasson .................... G09F 19/18
                                                        353/101
4,756,614 A *  7/1988 Kato ....................... G03B 23/105
                                                        353/110
(Continued)

*Primary Examiner* — William C. Dowling
(74) *Attorney, Agent, or Firm* — Li & Cai Intellectual Property Office

(57) ABSTRACT

A projection device and a household appliance are provided. The projection device includes a casing, a lens component, and a pattern lighting module. An opening is disposed at a front end of the casing. The lens component is disposed inside an accommodating space of the casing and fixed on the casing, and the lens component corresponds to the opening. The pattern lighting module is disposed inside the accommodating space of the casing and fixed on the casing, and the pattern lighting module corresponds to the lens component. The pattern lighting module emits at least one patterned light beam that passes through the lens component and the opening sequentially.

16 Claims, 13 Drawing Sheets

(51) Int. Cl.
*G01J 1/08* (2006.01)
*F21V 5/00* (2018.01)
*G01J 1/04* (2006.01)
*G01J 1/42* (2006.01)
*H05B 35/00* (2006.01)
*F21V 17/10* (2006.01)
*F21Y 105/16* (2016.01)
*G03B 21/20* (2006.01)
*F21Y 113/10* (2016.01)
*F21K 9/90* (2016.01)

(56) References Cited

U.S. PATENT DOCUMENTS

| | | | | |
|---|---|---|---|---|
| 5,367,349 | A * | 11/1994 | Zeiler | A63H 33/22 |
| | | | | 362/202 |
| 6,478,453 | B2 * | 11/2002 | Lammers | F21S 6/002 |
| | | | | 362/373 |
| 7,517,088 | B1 * | 4/2009 | Kretzschmar | G03B 29/00 |
| | | | | 353/100 |
| 7,556,385 | B2 * | 7/2009 | Kitahara | G03B 21/145 |
| | | | | 353/122 |
| 2004/0061840 | A1 * | 4/2004 | Baker | G03B 21/16 |
| | | | | 353/119 |

\* cited by examiner

PROJECTION DEVICE

CROSS-REFERENCE TO RELATED PATENT APPLICATION

This application claims the benefit of priority to China Patent Application No. 202011135591.5, filed on Oct. 21, 2020 in People's Republic of China.

The entire content of the above identified application is incorporated herein by reference.

This application claims priority to the U.S. Provisional Patent Application Ser. No. 62/935,671 filed on Nov. 15, 2019, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a projection device and a household appliance, and more particularly to a projection device and a household appliance generating clear images by utilizing a single lens.

BACKGROUND OF THE DISCLOSURE

In recent years, household appliances, such as washing machines, dishwashers etc., are usually configured with operation panels, with each of the operation panels including a digit display that displays an operation status of the household appliance.

However, when a user would like to know the current operation status of the household appliance, e.g., a status of dishes being washed inside a dishwasher, the user is required to walk up to the dishwasher and check the digit display to confirm said current operation status. This can be inconvenient for modern people who are busy working or doing house chores.

Therefore, it has become an important issue for the industry to overcome the above-mentioned inadequacies, such that the user does not have to walk up to the household appliance to confirm the current status of the household appliance.

SUMMARY OF THE DISCLOSURE

In response to the above-referenced technical inadequacies, the present disclosure provides a projection device and a household appliance.

In one aspect, the present disclosure provides a projection device including a casing, a lens component, and a pattern lighting module. An opening is disposed at a front end of the casing. The lens component is disposed inside an accommodating space of the casing and fixed on the casing, and the lens component corresponds to the opening. The pattern lighting module is disposed inside the accommodating space of the casing and fixed on the casing, and the pattern lighting module corresponds to the lens component. The pattern lighting module emits at least one patterned light beam that passes through the lens component and the opening sequentially.

In another aspect, the present disclosure provides a household appliance. The household appliance includes the projection device, so as to enable a user to monitor an operation status of the household appliance through the projection device.

One of the advantages of the projection device and the household appliance including the projection device of the present disclosure is that they can improve the convenience of using household appliances through the technical solutions of "a projection device including a casing, a lens component, and a pattern lighting module", "an opening disposed at a front end of the casing", "the lens component disposed inside an accommodating space of the casing and fixed on the casing, and the lens component corresponding to the opening", "the pattern lighting module disposed inside the accommodating space of the casing and fixed on the casing, and the pattern lighting module corresponding to the lens component", "the pattern lighting module emitting at least one patterned light beam that passes through the lens component and the opening sequentially", and "the user monitoring an operation status of the household appliance through the projection device", thereby making it unnecessary for the user to walk up to the household appliance to confirm a current status thereof.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
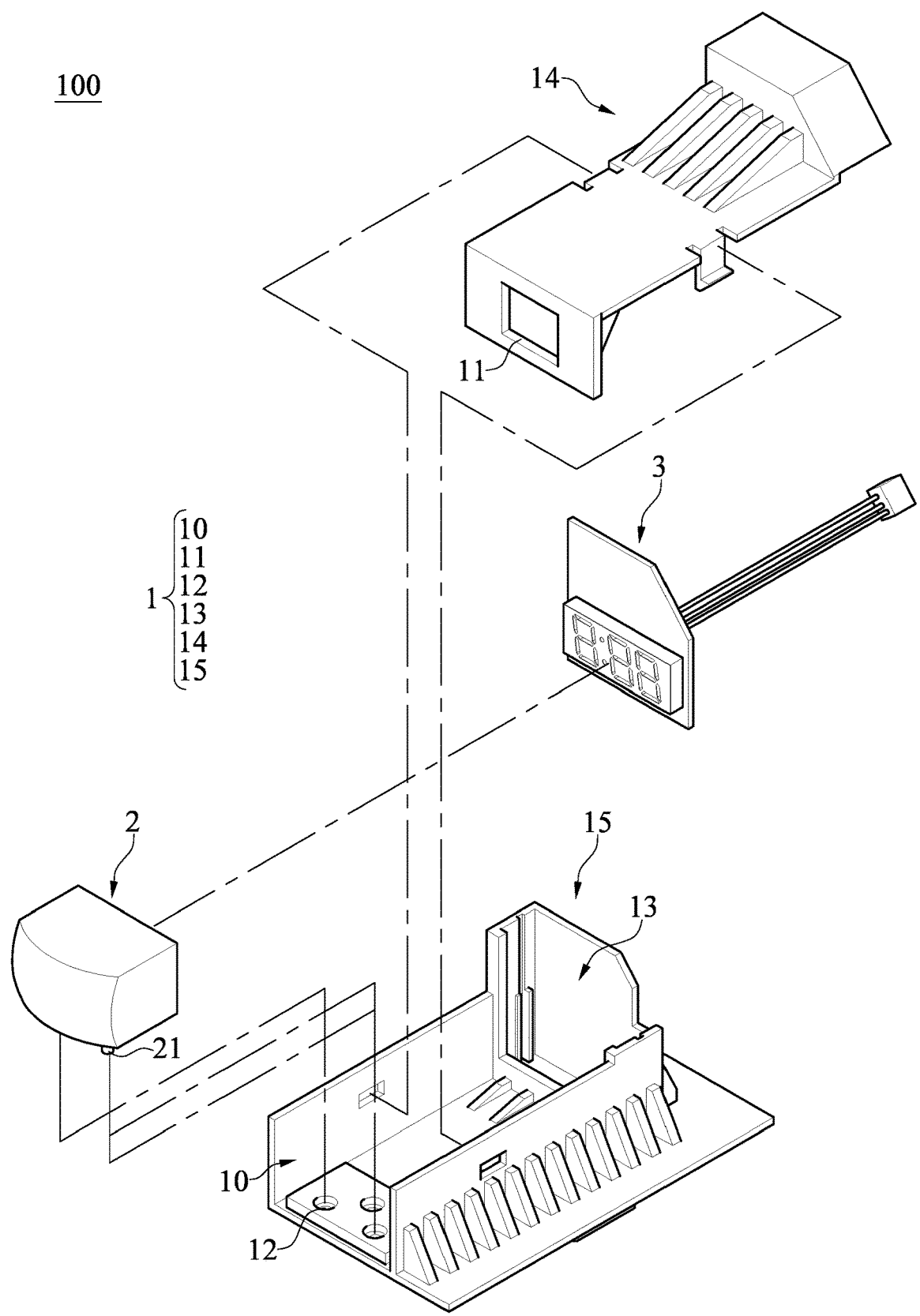
FIG. 1 is an exploded schematic view of a projection device in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Firstly, reference is made to FIG. 1, in which a projection device 100 is provided in a first embodiment of the present disclosure. The projection device 100 includes a casing 1, a lens component 2, and a pattern lighting module 3. An opening 11 is disposed at a front end of the casing 1, and an accommodating space 10 is defined inside the casing 1. The lens component 2 is disposed inside the accommodating space 10 and fixed on the casing 1, such that the lens component 2 corresponds to the opening 11. The pattern lighting module 3 is also disposed inside the accommodating space 10 and fixed on the casing 1, and the pattern lighting module 3 corresponds to the lens component 2.

More specifically, a bottom side of the casing 1 includes at least one positioning hole 12. At least one positioning rod 21 corresponding to the at least one positioning hole 12 is disposed on a bottom portion of the lens component 2 corresponding to the at least one positioning hole 12, and the lens component 2 is fixed on the casing 1 by having the at least one positioning rod 21 insert into the at least one positioning hole 12. A carrying part 13 is configured to a back end of the casing 1, and the pattern lighting module 3 is disposed on the carrying part 13 and fixed on the casing 1.

Furthermore, the casing 1 includes a first casing 14 and a second casing 15. The first casing 14 and the second casing 15 are detachably engaged with each other, and the accommodating space 10 is formed between the first casing 14 and the second casing 15. A front end of the first casing 14 is connected to a board portion, and the opening 11 is formed on the board portion.

Figure 2:
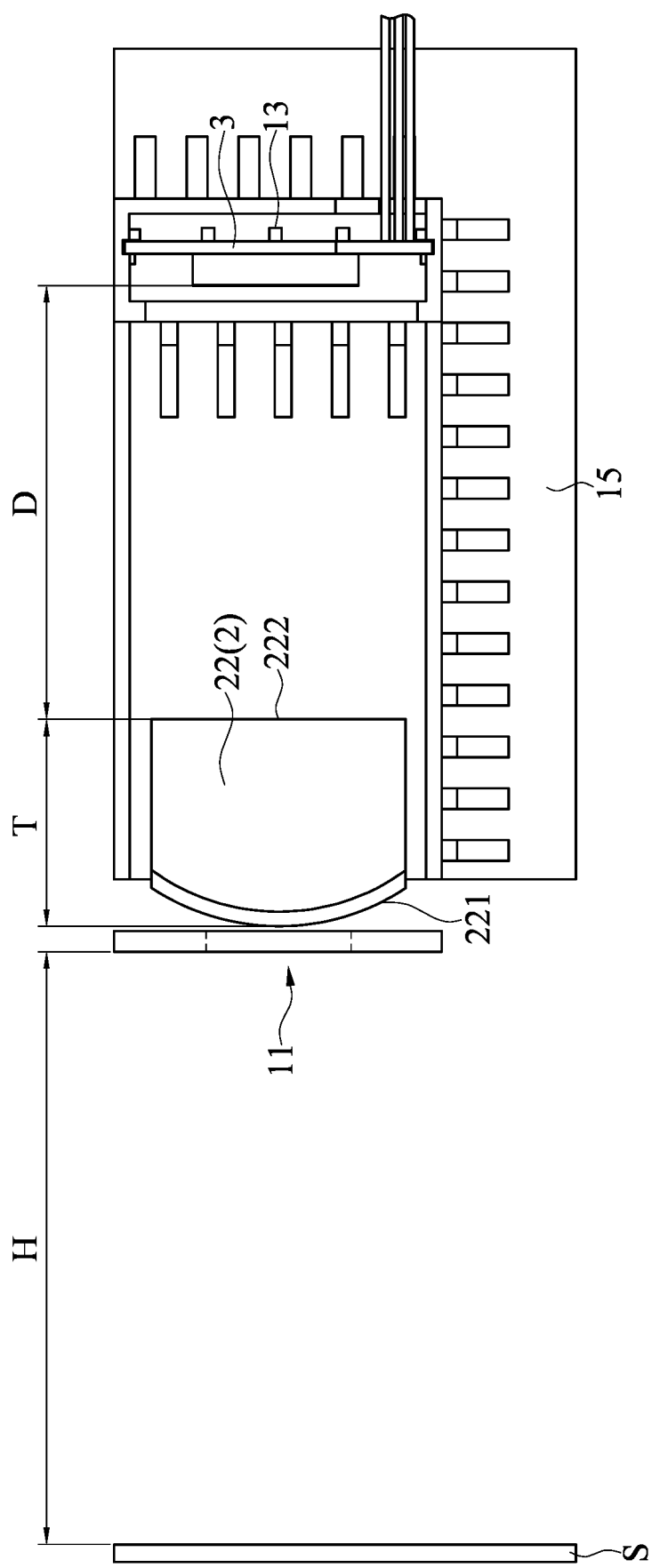
FIG. 2 is an assembled schematic view of a lens component and a pattern lighting module of the projection device in the first embodiment of the present disclosure.

Relative relations among and positions of the opening 11, the lens component 2, and the pattern lighting module 3 are further described as follows. Reference is made to FIG. 2, in which the lens component 2 and the pattern lighting module 3 are both disposed in the accommodating space 10 and fixed on the casing 1. The lens component 2 is disposed corresponding to the opening 11, the pattern lighting module 3 is disposed corresponding to the lens component 2, and the lens component 2 is positioned between the opening 11 and the pattern lighting module 3.

Figure 3:
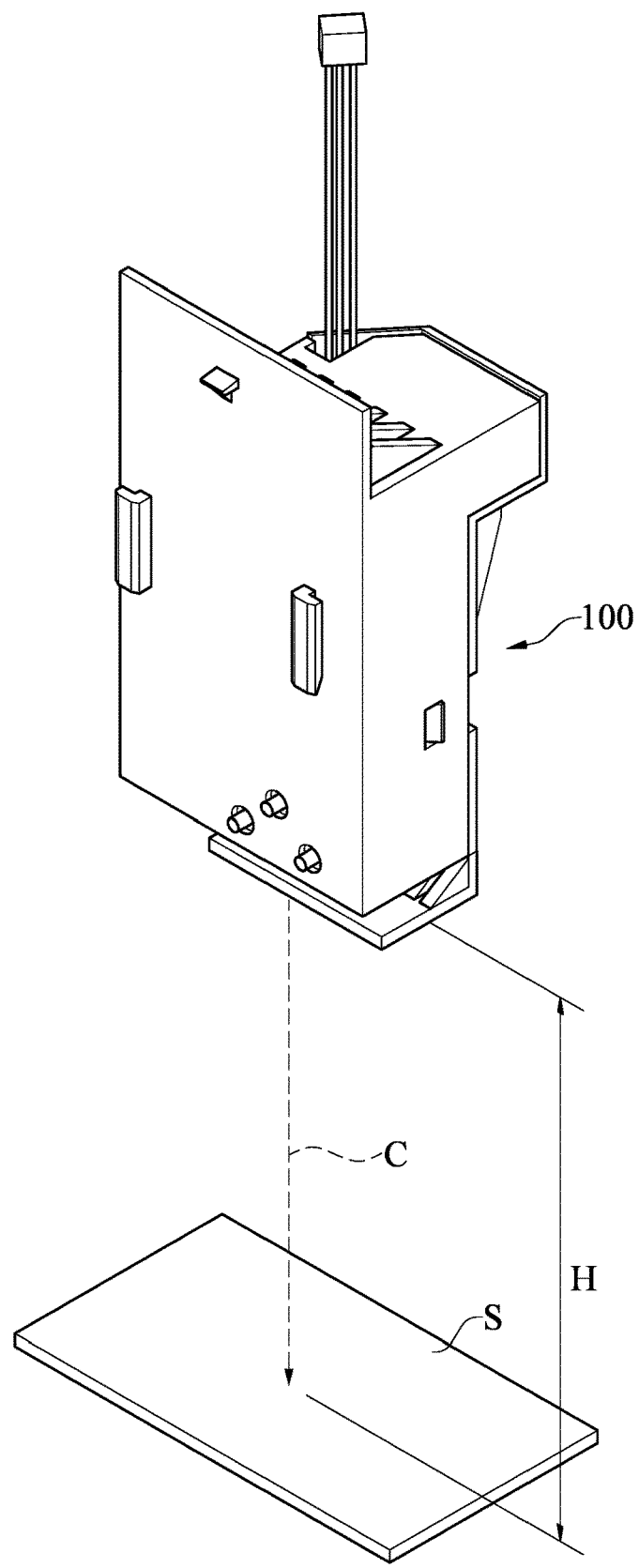
FIG. 3 is a perspective schematic view of the projection device in the first embodiment of the present disclosure.
Figure 8:
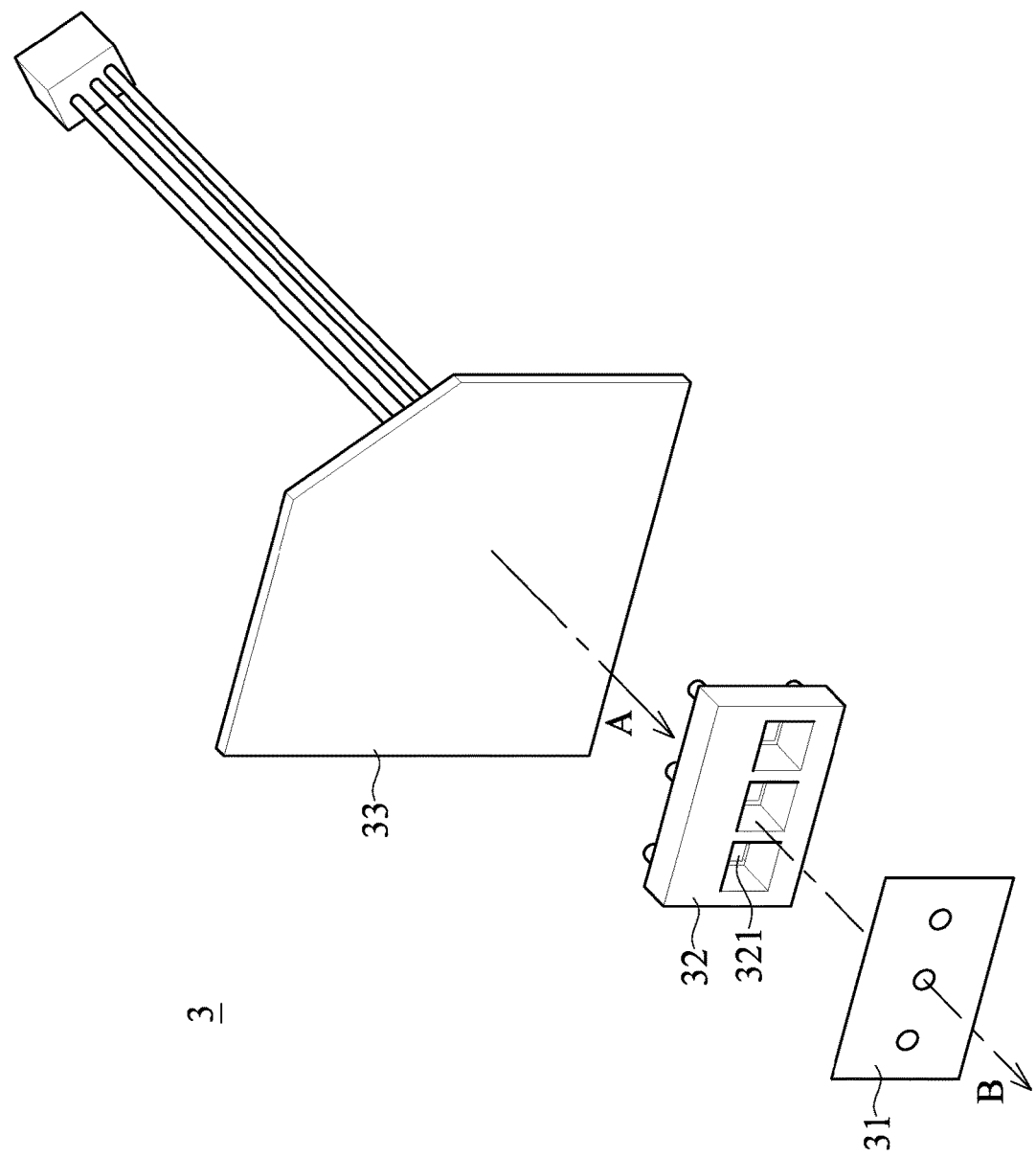
FIG. 8 is a first schematic view of the pattern lighting module of the projection device in the first embodiment of the present disclosure.
Figure 9:
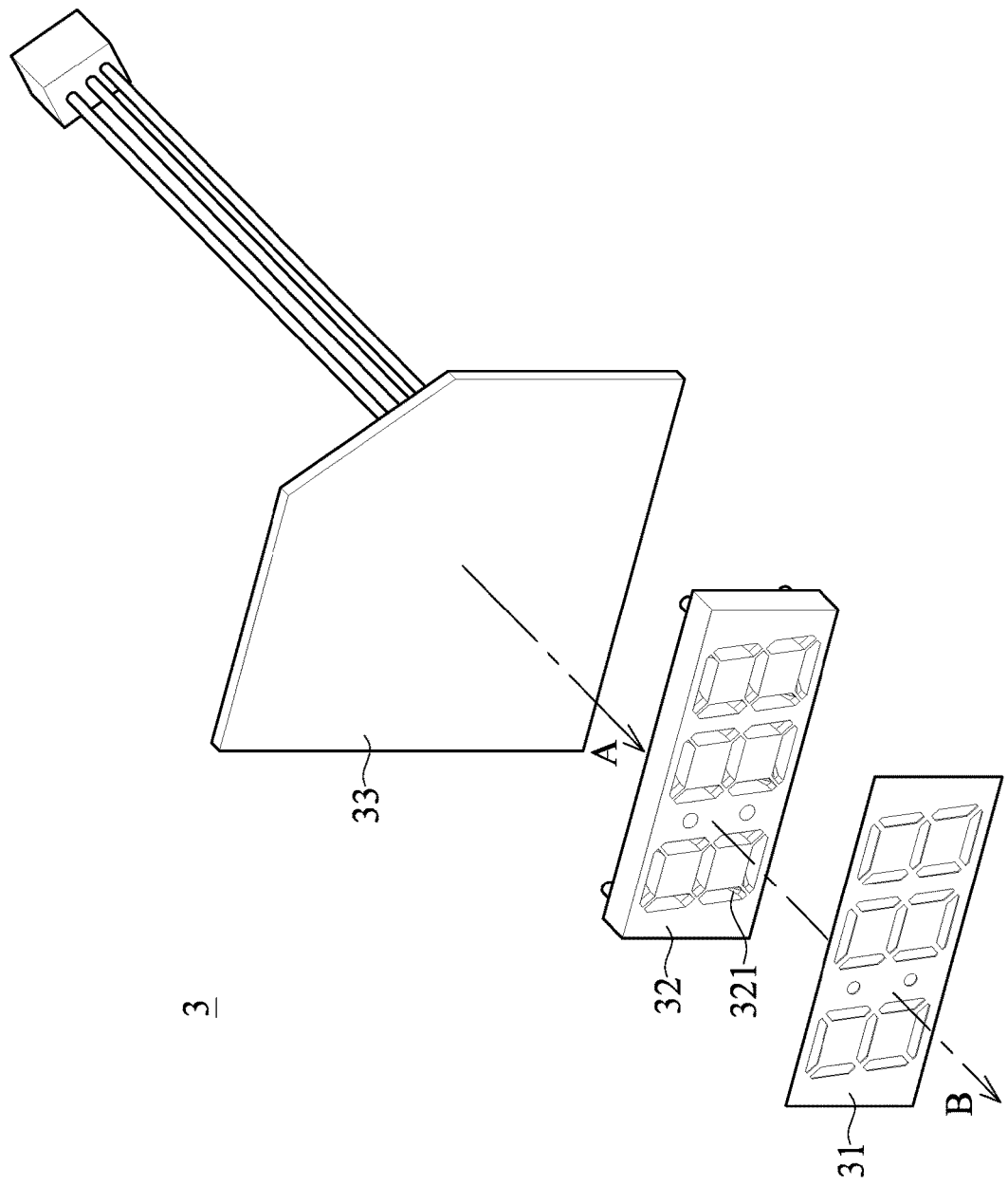
FIG. 9 is a second schematic view of the pattern lighting module of the projection device in the first embodiment of the present disclosure.

References are made to FIG. 2 and FIG. 3, which are to be read in conjunction with FIG. 8 and FIG. 9. The pattern lighting module 3 emits at least one patterned light beam B that passes through the lens component 2 and the opening 11 sequentially, and then the at least one patterned light beam B with a predetermined pattern configured as at least one of an alphanumeric character and a graphical character is enlarged and projected to form a clear image without ghosting at a predetermined distance H from the opening 11. The predetermined distance H is the shortest distance at which a clear image without ghosting can be formed. The predetermined distance H can be adjusted according to actual requirements of a user through adjusting a curvature of the lens component 2, and will be described in more detail later. A light (a light image C) can be projected on a receiving surface S after passing through the lens component 2 and the opening 11. The receiving surface S can be a wall, a ground, or any object that can display the projection. In the present disclosure, the predetermined distance H is substantially greater than 100 mm; in other words, the predetermined distance H of the light emitted from the opening 11 to the receiving surface S is greater than 100 mm.

Figure 4:
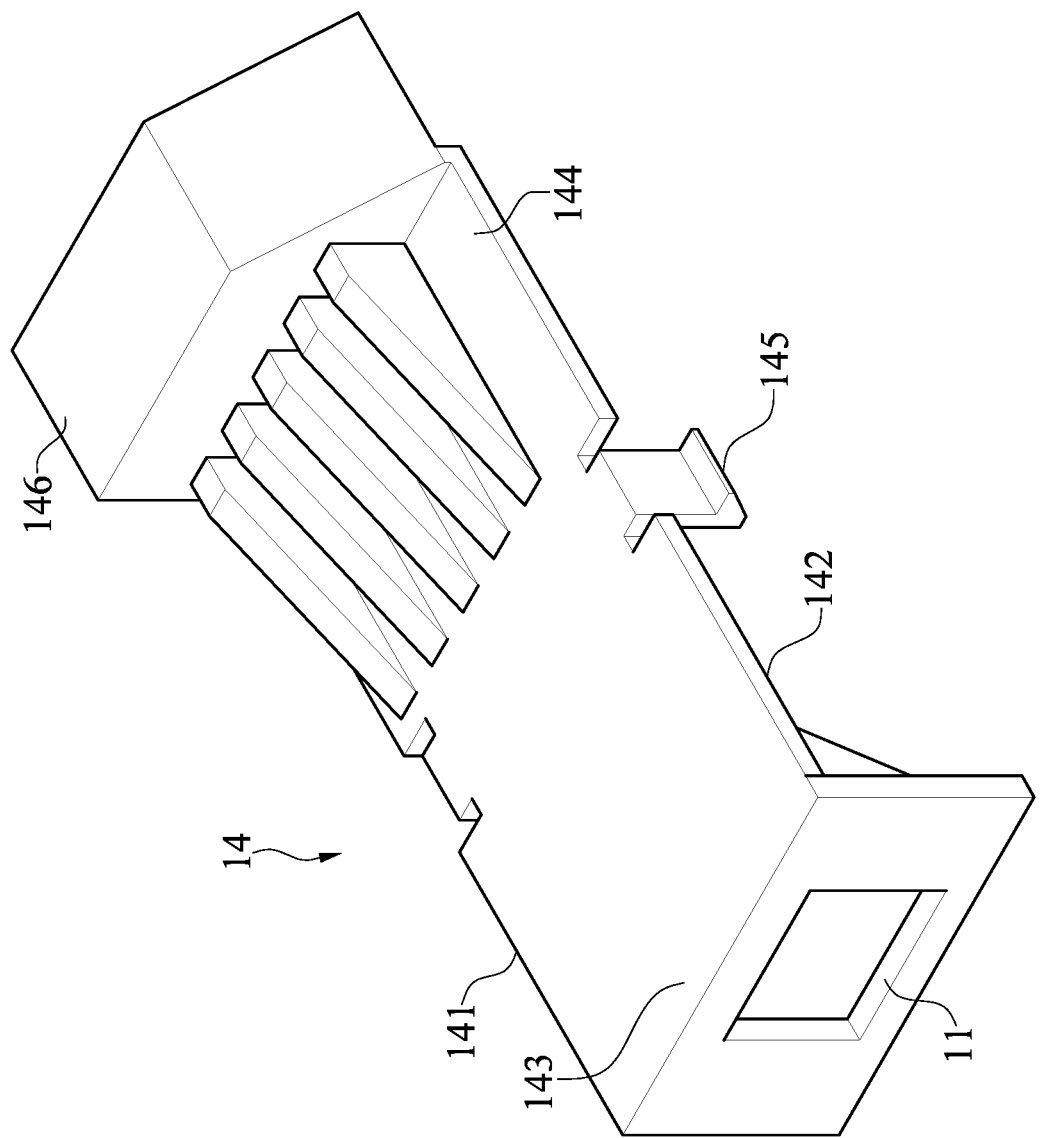
FIG. 4 is a first schematic view of a first casing of the projection device in the first embodiment of the present disclosure.
Figure 5:
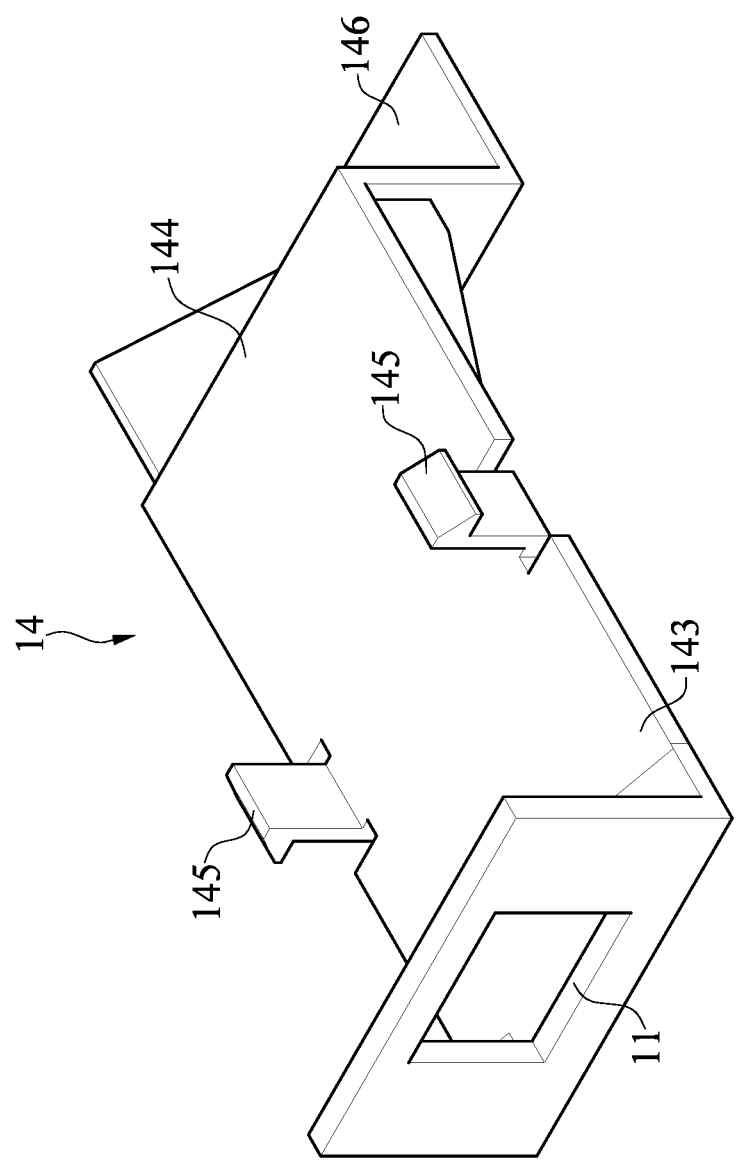
FIG. 5 is a second schematic view of the first casing of the projection device in the first embodiment of the present disclosure.

Reference is made to FIG. 4 and FIG. 5, which show the first casing 14 from different perspectives, respectively. Specifically, the first casing 14 includes a long side 141 and another long side 142 corresponding to each other, and a short side 143 and another short side 144 corresponding to each other. The above-mentioned board portion is disposed on the short side 143 of the first casing 14. Each of the long side 141 and the another long side 142 of the first casing 14 has a first engaging member 145. A casing cover 146 is disposed on the another short side 144 of the first casing 14 opposite to a direction toward which the board portion extends.

Figure 6:
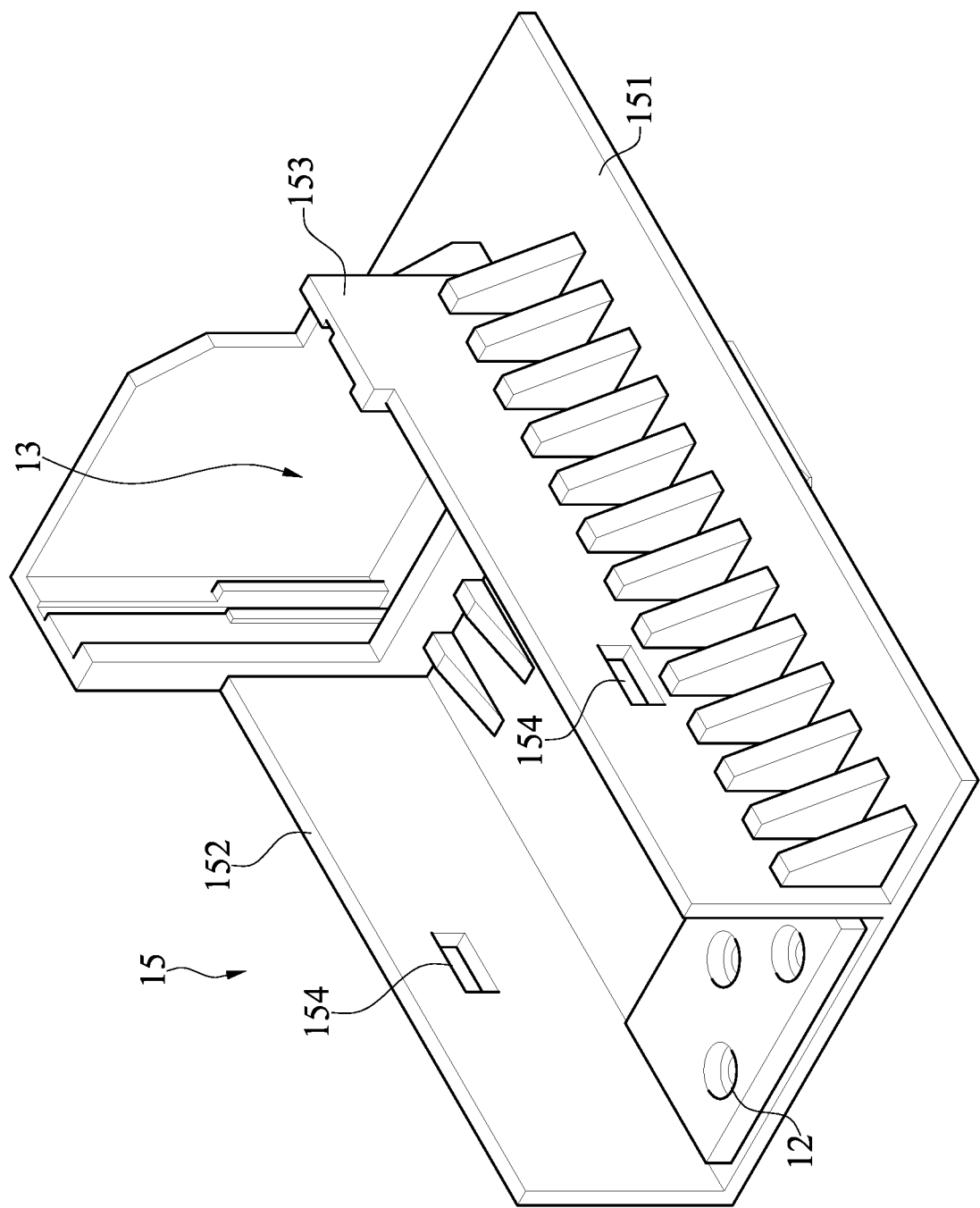
FIG. 6 is a first schematic view of a second casing of the projection device in the first embodiment of the present disclosure.
Figure 7:
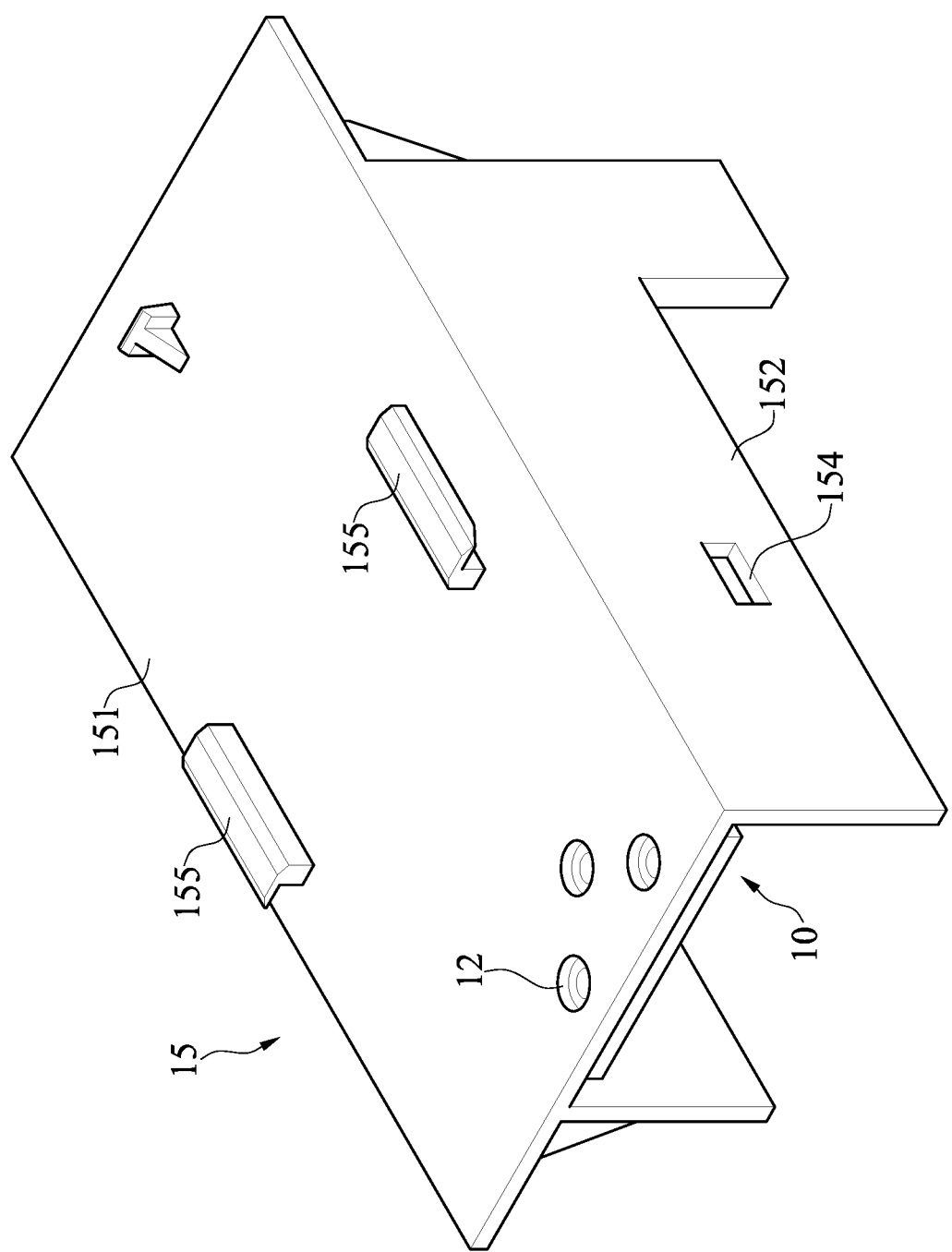
FIG. 7 is a second schematic view of the second casing of the projection device in the first embodiment of the present disclosure.

References are made to FIG. 6 and FIG. 7, which are different perspectives of the second casing 15. Specifically, the second casing 15 includes a bottom board 151, and the carrying part 13 is disposed on the bottom board 151. The second casing 15 further includes a side wall 152 and another side wall 153 disposed corresponding to each other, and the carrying part 13 is further connected to the side wall 152 and the another side wall 153. Each of the side wall 152 and the another side wall 153 of the second casing 15 has a second engaging member 154 corresponding to the first engaging member 145 of the first casing 14, and the second engaging member 154 is disposed on each of the side walls 152 and 153. The positioning hole 12 is formed between the side wall 152 and the another side wall 153 at a front end of the second casing 15, and is opposite to the carrying part 13.

References are further made to FIG. 4 and FIG. 6, in which the first casing 14 and the second casing 15 are engaged with each other through the first engaging members 145 engaging with the second engaging members 154. The first engaging members 145 and the second engaging members 154 can be a detachable joint assembly. For example, in the present disclosure, each of the first engaging members 145 can be a buckle and each of the second engaging members 154 can be a through hole having a shape corresponding to that of the buckle. However, the above-mentioned examples are merely one of the operable implementations, and the present disclosure is not limited thereto.

Moreover, at least one third engaging member 155 is disposed on a lower surface of the casing 1. To be more specific, the at least one third engaging member 155 is disposed on the bottom board 151 of the second casing 15 as shown in FIG. 7. More specifically, the at least one third engaging member 155 and the carrying part 13 are disposed on two opposite sides of the bottom board 151, respectively. The projection device 100 of the present disclosure can be affixed to an external structure through the at least one third engaging member 155. The external structure can be a groove, a guiding rail, a through hole, etc. of a refrigerator, a dishwasher, or a washing machine, and the present disclosure is not limited thereto.

References are further made to FIG. 1, FIG. 2, and FIG. 6, as mentioned above, the at least one positioning rod 21 is disposed on the bottom portion of the lens component 2 (as shown in FIG. 1), and the at least one positioning rod 21 corresponds to the at least one positioning hole 12 on the second casing 15. Furthermore, an amount, a shape, and a size of the at least one positioning rod 21 match with that of the at least one positioning hole 12, such that the lens component 2 can be fixed on the second casing 15 through the at least one positioning rod 21 inserting the at least one positioning hole 12. It is worth mentioning that, in this embodiment, the lens component 2 is a plane-convex lens 22 that includes a first convex surface 221 and a plane surface 222 disposed corresponding to each other, and a curvature of the first convex plane 221 is greater than or equal to 0.045, or more preferably, equal to 0.045.

Referring to FIG. 8, the pattern lighting module 3 includes a pattern film 31, a reflective cover 32, and a light component 33. The reflective cover 32 includes at least one through hole 321, and the quantity of the at least one through hole can be one or more than one. The reflective cover 32 is disposed on the light component 33, and the pattern film 31 is disposed on the reflective cover 32 and disposed corresponding to the at least one through hole 321. In other words, the reflective cover 32 is disposed between the pattern film 31 and the light component 33. Patterns, characters, or numbers that are to be projected can be designed on the pattern film 31, and the shape of the at least one through hole 321 is designed according to the patterns, the characters, and the numbers that are designed on the pattern film 31.

The light component 33 emits the at least one initial light beam A that passes through the at least one through hole 321 and the pattern film 31, so as to form the at least one patterned light beam B. It should be noted that a basic structure of the light component 33 includes a printed circuit board assembly (PCBA) of a light emitting diode (LED). After the at least one initial light beam A emitted by the light component 33 passes through the at least one through hole 321 and the pattern film 31, the at least one initial light beam A forms the at least one patterned light beam B according to the shape of the at least one through hole 321 and the patterns designed on the pattern film 31. When the at least one through hole 321 has a shape of a circle, the patterns on the pattern film 31 will be designed as round holes accordingly, such that the at least one patterned light beam B formed through the at least one initial light beam A emitted by the light component 33 passing through the at least one through hole 321 and the pattern film 31 forms at least one point light source. In other words, the light component 33 is an LED unit that forms the at least one point light source, and the at least one point light source corresponding to the at least one through hole 321.

Further referring to FIG. 9, when the quantity of the at least one through hole 321 on the reflective cover 32 is more than one (i.e., a plurality of through holes 321), the through holes 321 are arranged to form patterns, numbers, and characters, and the graphics of the pattern film 31 are also designed to be patterns, numbers, and characters. The at least one patterned light beam B is formed through having the at least one initial light beam A emitted by the light component 33 pass through the at least one through hole 321, and the pattern film 31 forms a pattern light source, a number light source, or a character light source. In other words, the light component 33 is a digit display unit that forms the pattern light source, the number light source, or the character light source. The pattern light source, the number light source, or the character light source respectively corresponds to one of the patterns, one of the numbers, or one of the characters that is arranged thereinto by the through holes 321.

Figure 10:
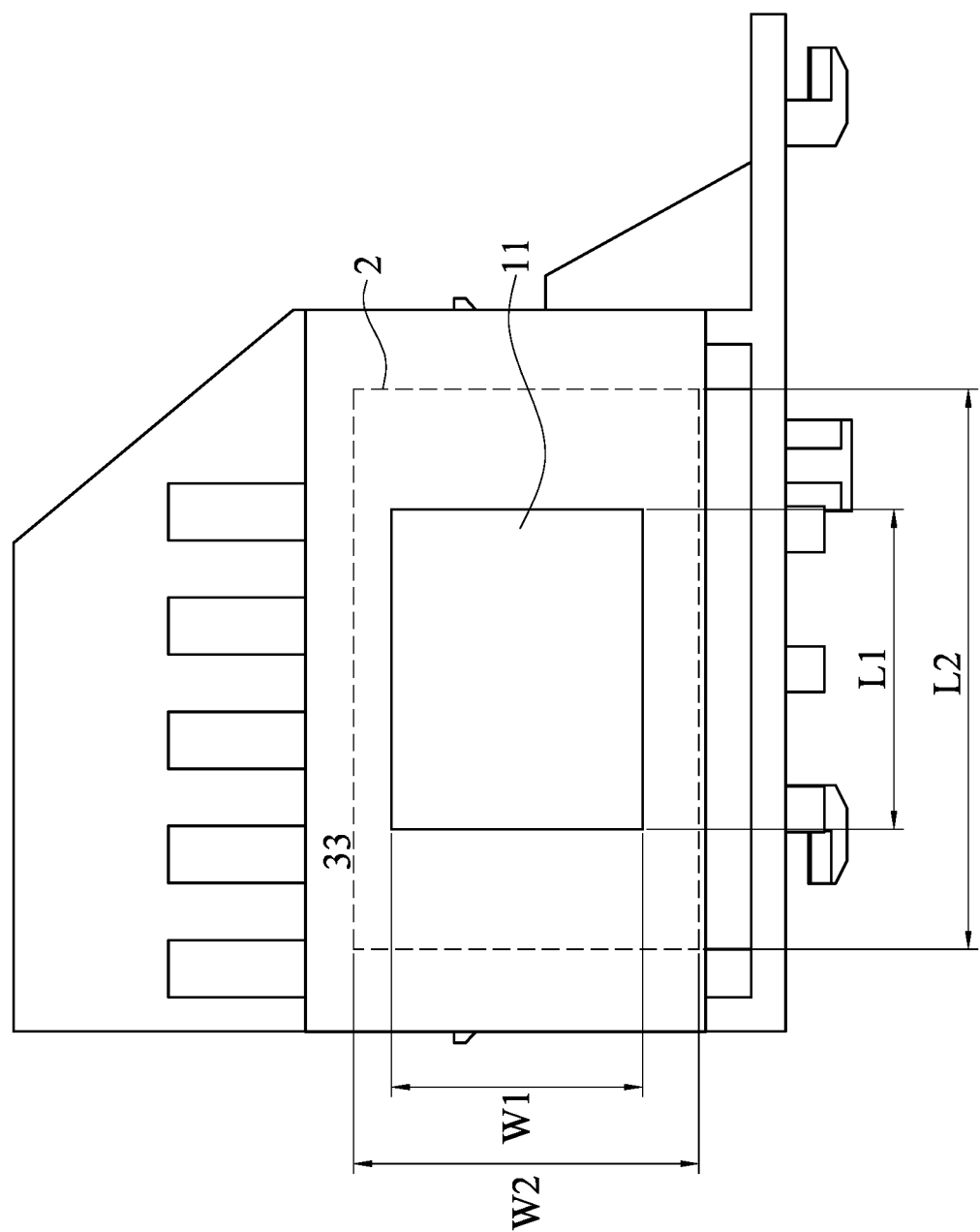
FIG. 10 is a schematic view showing a ratio between the lens component and an opening of the first casing of the projection device in the first embodiment of the present disclosure.

Reference is further made to FIG. 2, which is to be read in conjunction with FIG. 10. FIG. 10 shows a ratio between the lens component 2 and the opening 11. The opening 11 is mainly utilized to block stray light generated by the at least one patterned light beam B of the pattern lighting module 3, so that light passing through the opening 11 can be more concentrated, thereby preventing ghosting on the image that is projected on the receiving surface S (i.e., preventing a blurred image from being formed by two images that are partially overlapped with each other). The ratio between a size of the opening 11 and a size of the lens component 2 affects an amount of stray light that is filtered. In the present disclosure, an area of the opening 11 (L1×W1) is less than an area of the lens component 2 (L2×W2); preferably, the ratio of the area of the opening 11 to the area of the lens component 2 is between 0.25 and 0.5. The amount of stray light that is filtered under the afore-mentioned ratio allows the image that is projected on the receiving surface S to be clear without ghosting.

As shown in the following Table 1, the ratio between the area of the opening 11 (L1×W1) and the area of the lens component 2 (L2×W2) is further described. The present disclosure focuses on a discussion of different sizes of the opening 11 and of the lens component 2 that is within the above-mentioned ratio between 0.25 and 0.5. When a length L2 of the lens component 2 is fixed at 24.5 mm, and a width W2 of the lens component 2 is fixed at 15 mm, the area of the lens component 2 (L2×W2) is fixed at 367.5 mm$^2$. Moreover, the area of the opening 11 is varied to obtain different ratios of the areas between 0.25 and 0.5, and clarity of the image formed on the receiving surface S is observed. When the length L1 of the opening 11 is at 14.7 mm and the width W1 of the opening 11 is at 7.5 mm, making the area of the opening 11 (L1×W1) 110.25 mm², the ratio of the area of the opening 11 to that of the lens component 2 is 0.3, which produces an image with the best clarity and without ghosting on the receiving surface S.

TABLE 1

| Embodiment | Length × Width (L1 × W1) of opening | Length × Width (L1 × W1) of lens component | Ratio of length (L1/L2) and ratio of width (W1/W2) | Area of opening (mm²) | Area of lens component (mm²) | Ratio of area (L1 × W1)/(L2 × W2) |
|---|---|---|---|---|---|---|
| 1 | 12.25 × 7.5 | 24.5 × 15 | 0.5 | 91.875 | 367.5 | 0.25 |
| 2 | 14.7 × 9 | 24.5 × 15 | 0.6 | 132.3 | 367.5 | 0.36 |
| 3 | 17.15 × 10.5 | 24.5 × 15 | 0.7 | 180.075 | 367.5 | 0.49 |
| 4 | 19.6 × 12 | 24.5 × 15 | 0.8 | 235.2 | 367.5 | 0.64 |
| 5 | 22.05 × 13.5 | 24.5 × 15 | 0.9 | 297.675 | 367.5 | 0.81 |
| Preferred embodiment | 14.7 × 7.5 | 24.5 × 15 | L1/L2 = 0.6 W1/W2 = 0.5 | 110.25 | 367.5 | 0.3 |

Reference is further made to FIG. 2, as mentioned above, the predetermined distance H can be adjusted according to actual requirements of the user through adjusting the curvature of the lens component 2. In this embodiment, the lens component 2 is the plane-convex lens 22 that includes the first convex surface 221 and the plane surface 222. The pattern lighting module 3 and the plane-convex lens 22 are fixed on the second casing 15, the plane surface 222 faces toward the pattern lighting module 3, and the first convex surface 221 faces toward the opening 11. A thickness T of the plane-convex lens 22 is 19.6 mm, the curvature of the first convex surface 221 is greater than or equal to 0.045, and more preferably equal to 0.045. The at least one patterned light beam B generated by the pattern lighting module 3 passes through the plane-convex lens 22 and the opening 11, and then projected to form an enlarged and clear image without ghosting at the predetermined distance H from the opening 11. The predetermined distance is 160 mm. That is to say, when the light image C is projected to the receiving surface S and forms an image at a position that is greater than or equal to 160 mm from the opening 11, the image can be clear and without ghosting. In addition, in this embodiment, a distance D between the plane surface 222 of the plane-convex lens 22 and the pattern lighting module 3 is 42 mm.

Second Embodiment

Figure 11:
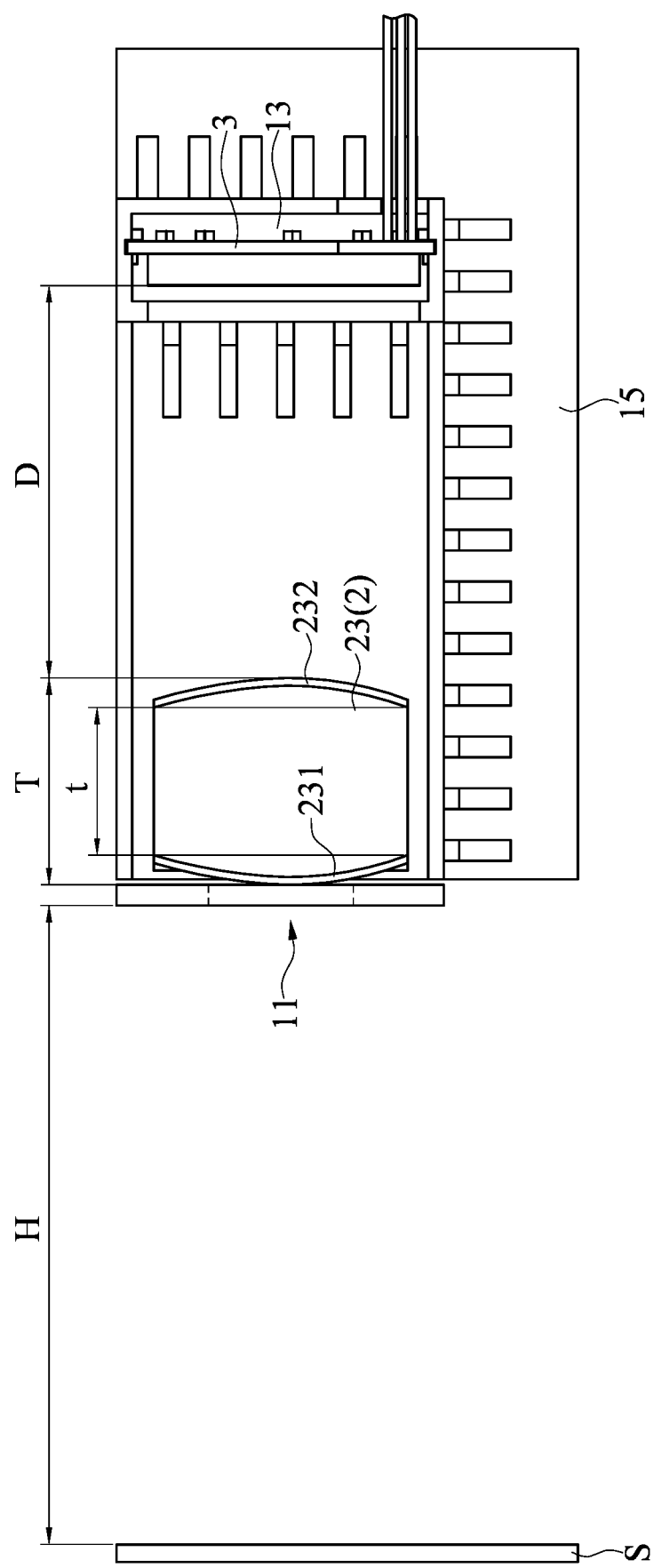
FIG. 11 is an assembled schematic view of the lens component and the pattern lighting module of the projection device in a second embodiment of the present disclosure.

Referring to FIG. 11, in the second embodiment, relative positions among the opening 11, the lens component 2, the pattern lighting module 3, and the ratio between the area of the lens component 2 and the area of the opening 11, and an operation manner of the pattern lighting module 3 are identical to that described in the first embodiment, and will not be reiterated herein. The difference between the second embodiment and the first embodiment is that the lens component 2 is a biconvex lens 23 including two second convex surfaces 231 and 232 that are located on opposite sides of the biconvex lens 23. The two second convex surfaces 231 and 232 respectively face toward the opening 11 and the pattern lighting module 3. Another thickness T of the biconvex lens 23 is 21 mm, and a curvature of each of the two second convex surfaces 231 and 232 is between 0.025 and 0.05. Preferably, in this embodiment, the curvatures of the two second convex surfaces 231 and 232 are both 0.03, which are identical to each other. The at least one patterned light beam B generated by the pattern lighting module 3 passes through the biconvex lens 23 and the opening 11, and is then projected to form a clear image without ghosting that is enlarged at another predetermined distance H from the opening 11. The another predetermined position H is 140 mm. That is to say, when the light image C is projected to the receiving surface S and forms an image at a position that is greater than or equal to 140 mm from the opening 11, the image can be clear and without ghosting. Moreover, in this embodiment, another distance D between the second convex surface 232 of the biconvex lens 23 and the pattern lighting module 3 is 38 mm.

In another embodiment, the curvatures of the two second convex surfaces 231 and 232 of the biconvex lens 23 can both be 0.04, respectively, and yet another thickness of the biconvex lens 23 is 30 mm. The at least one patterned light beam B generated by the pattern lighting module 3 passes through the biconvex lens 23 and the opening 11, and is then projected to form a clear image without ghosting that is enlarged at another predetermined distance H. In this embodiment, yet another predetermined distance T is 105 mm. That is to say, when the light image C is projected to the receiving surface S and forms an image at a position that is greater than or equal to 105 mm from the opening 11, the image can be clear without ghosting. In this embodiment, yet another distance D between the second convex surface 232 of the biconvex lens 23 and the pattern lighting module 3 is 27 mm.

In a preferable embodiment of the present disclosure, the lens component 2 is a thick lens. More specifically, both the plane-convex lens 22 in the first embodiment and the biconvex lens 23 in the second embodiment are thick lenses. The thick lens is defined as an optical transparent object with a certain thickness between two refraction surfaces of the optical transparent object. For example, further referring to FIG. 11, the lens component 2 has an inner thickness t that is greater than 0 millimeters.

Therefore, in view of optical object distance, optical image distance, and optical magnification, but also based on subsequent structural design, an overall diopter of the lens component 2 is required to be greater than 0.022. That is to say, when a clear image is formed at a position which has the predetermined distance of 160 mm from the opening 11, the diopter of the lens component 2 is required to be greater than or equal to 0.022. Furthermore, formulas of diopter P are listed in the following:

$$P = P1 + P2 - P1 \times P2 \times T/n' = (n'-n)/r1;$$

$$P1 = (n'-n)/r1;$$

$$P2 = (n''-n')/r2;$$

P1 is a diopter of the second convex surface 232 of the lens component 2, r1 is a radius of curvature of the second convex surface 232, P2 is a diopter of the second convex surface 231 of the lens component 2, and r2 is a radius of curvature of the second convex surface 231. T is the thickness of the lens component 2. n is a refractive index of a light entering medium, and n" is a refractive index of a light exiting medium. n' is a refractive index of the lens component 2, and n' equals 1.491. Both the light entering medium and the light exiting medium are air; therefore, n=n"=1. The thickness T of the lens component 2 is 19.6 mm, the radius of curvature r1 of the second convex surface 232 is between 0 and 0.05 (i.e., 0≤r1≤0.05), the radius of curvature r2 of the second convex surface 231 is between 0 and 0.045 (i.e., 0≤r2≤0.045), and r1 and r2 cannot be 0 at the same time, thereby forming a clear image at the predetermined distance H from the opening 11, under a condition that the predetermined distance H is 160 mm. For example, when r1=0.05 and r2=0.045, P=0.039514, which satisfies a condition of the diopter of the lens component 2 being greater than or equal to 0.022, a clear image is formed at a position which has the predetermined distance H of 160 mm from the opening 11.

As shown in Table 2, Table 2 shows the diopters and different positions of the predetermined H at which a clear image is formed corresponding to different thickness of the lens component 2, respectively, under a condition that the projection device 100 of the present disclosure satisfies the relationships of 0≤r1≤0.05 and 0≤r2≤0.045.

TABLE 2

| Embodiment | Diopter of lens component 2 | Curvature of second convex surface 232 (curvature of r1) | Curvature of second convex surface 231 (curvature of r2) | Thickness T (mm) | Predetermined distance H at which a clear image forms (mm) |
|---|---|---|---|---|---|
| 1-1 | 0.0221 | 0 | 0.045 | 19.6 | 160 |
| 1-2 | 0.0226 | 0.025 | 0.025 | 19.6 | 160 |
| 1-3 | 0.0395 | 0.050 | 0.045 | 19.6 | 160 |
| 2-1 | 0.0225 | 0.020 | 0.030 | 21 | 140 |
| 2-2 | 0.0264 | 0.030 | 0.030 | 21 | 140 |
| 3-1 | 0.0236 | 0.020 | 0.035 | 30 | 105 |
| 3-2 | 0.0315 | 0.040 | 0.040 | 30 | 105 |
| 3-3 | 0.0303 | 0.045 | 0.030 | 30 | 105 |

Figure 12:
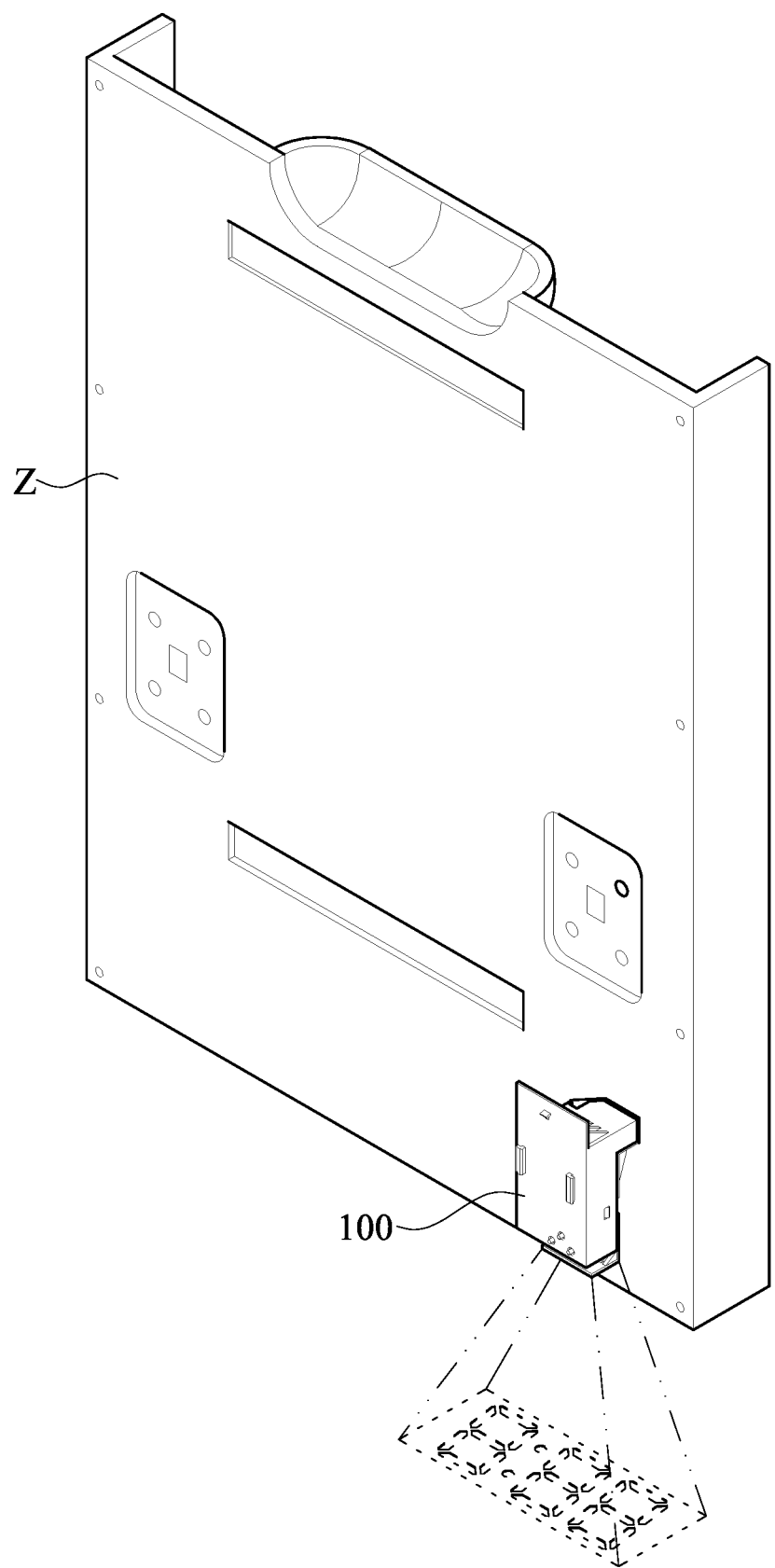
FIG. 12 is a schematic view showing the projection device monitoring an operation status of a household appliance of the present disclosure.
Figure 13:
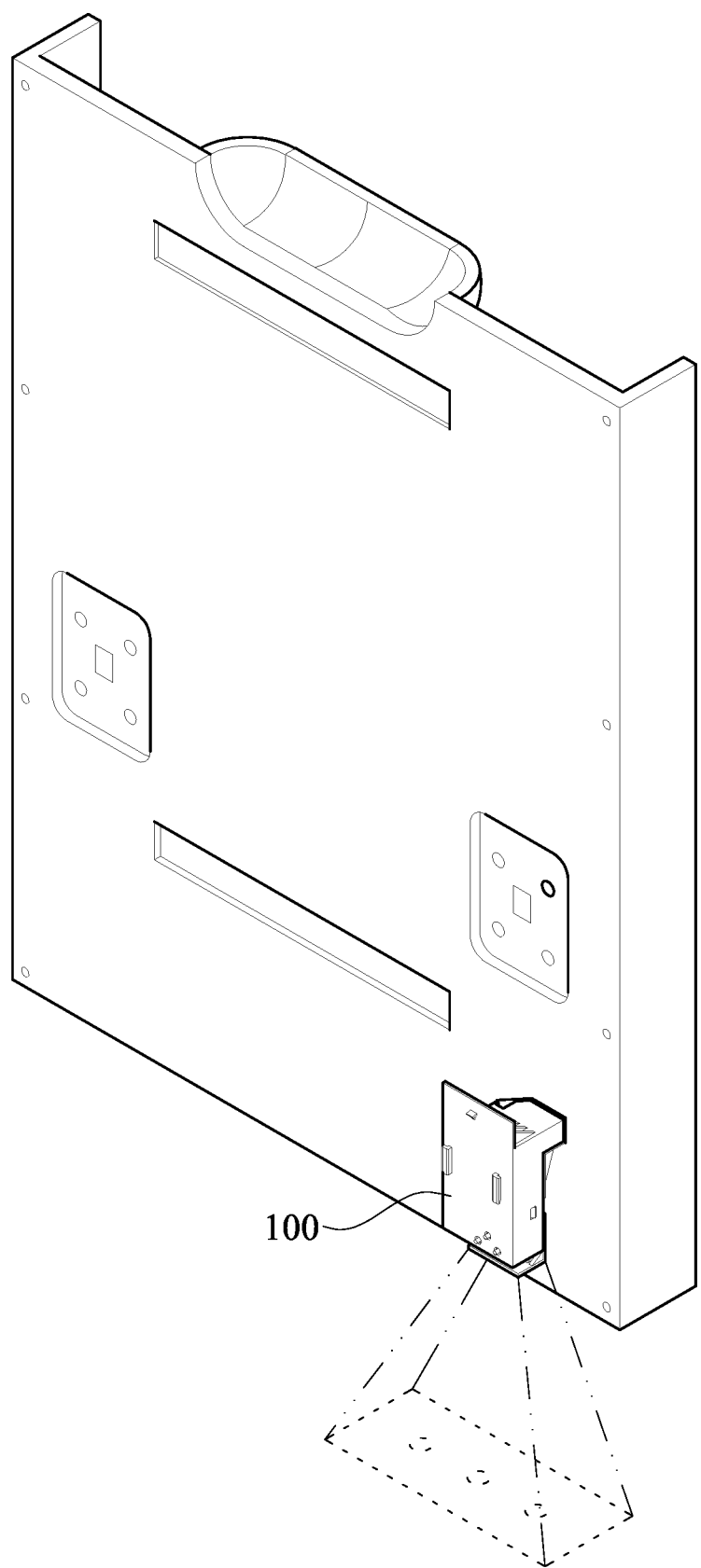
FIG. 13 is another schematic view showing the projection device monitoring an operation status of the household appliance of the present disclosure.

Referring to FIG. 12 and FIG. 13, a household appliance Z is provided by the present disclosure, and the household appliance Z includes the projection device 100 mentioned in any of the above embodiments. The user can monitor an operation status of the household appliance Z through the projection device 100. The household appliance Z includes, but is not limited to, a refrigerator, a dishwasher, or a washing machine.

Beneficial Effects of Embodiments

One of the advantages of the projection device 100 and the household appliance Z including the projection device 100 is that they can improve the convenience of utilizing household appliances, thereby making it unnecessary for the user to walk up to the household appliance to confirm a current status thereof through the technical solutions of "the opening 11 disposed at the front end of the casing 1", "the lens component 2 disposed inside the accommodating space 10 of the casing 1 and fixed on the casing 1, and the lens component 2 corresponding to the opening 11", "the pattern lighting module 3 disposed inside the accommodating space 10 of the casing 1 and fixed on the casing 1, and the pattern lighting module 3 corresponding to the lens component 2", "the pattern lighting module 3 emitting the at least one patterned light beams B that passes through the lens component 2 and the opening 11 sequentially", and "the user monitoring an operation status of the household appliance Z through the projection device 100".

Furthermore, compared to the conventional technology that requires utilizing a plurality of lenses to solve the problem of the ghosting effect on the image, the projection device 100 of the present disclosure requires only the lens component 2 in cooperation with the opening 11 having a certain ratio of size with respect thereto; that is, the at least one patterned light beam B generated by the pattern lighting module 3 can pass through the lens component 2 and the opening 11, and then be enlarged and projected to the receiving surface S at the predetermined distance H to form a clear image without ghosting. Therefore, a projection method of the projection device 100 of the present disclosure is more simple and cost-effective (in that the costs for excess lenses are saved).

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A projection device, comprising:
a casing having an opening that is disposed at a front end of the casing;
a lens component disposed inside an accommodating space of the casing and fixed on the casing, the lens component corresponding to the opening; and
a pattern lighting module disposed inside the accommodating space of the casing and fixed on the casing, the pattern lighting module corresponding to the lens component, wherein the pattern lighting module includes a pattern film, a reflective cover, and a light component, and wherein the reflective cover has at least one through hole, the reflective cover is disposed on the light component, and the pattern film is disposed on the reflective cover and disposed corresponding to the at least one through hole;
wherein the pattern lighting module emits at least one patterned light beam that sequentially passes through the lens component and the opening.

2. The projection device according to claim 1, wherein an area of the opening is less than an area of the lens component.

3. The projection device according to claim 1, wherein a ratio of an area of the opening to an area of the lens component is between 0.25 and 0.5.

4. The projection device according to claim 1, wherein at least one positioning hole is formed on a bottom side of the casing, at least one positioning rod is disposed on a bottom portion of the lens component corresponding to the at least one positioning hole, and the lens component is fixed on the casing by insertion of the at least one positioning rod through the at least one positioning hole.

5. The projection device according to claim 4, wherein a carrying part is configured to a back end of the casing, and the pattern lighting module is disposed on the carrying part and fixed on the casing.

6. The projection device according to claim 1, wherein the casing includes a first casing and a second casing, and the first casing and the second casing are detachably engaged with each other, and wherein the first casing has a first engaging member, the second casing has a second engaging member corresponding to the first engaging member, and the first casing and the second casing are engaged with each other by engagement of the first engaging member to the second engaging member.

7. The projection device according to claim 6, wherein the first engaging member is a buckle and the second engaging member is a through hole having a shape corresponding to that of the buckle.

8. The projection device according to claim 1, wherein the light component emits at least one initial light beam that sequentially passes through the at least one through hole and the pattern film, so as to form the at least one patterned light beam.

9. The projection device according to claim 8, wherein the light component is at least one light emitting diode unit that forms at least one point light source, and the at least one point light source corresponds to the at least one through hole.

10. The projection device according to claim 8, wherein the at least one through hole is utilized to arrange patterns, numbers, and characters.

11. The projection device according to claim 10, wherein the light component is a digit display unit that forms at least one of a pattern light source, a number light source, and a character light source, and the pattern light source, the number light source, or the character light source respectively corresponds to one of the patterns, one of the numbers, or one of the characters that is arranged by the at least one through hole.

12. The projection device according to claim 1, wherein the lens component has an inner thickness that is greater than 0 millimeters.

13. The projection device according to claim 1, wherein the lens component has a diopter that is greater than 0.022.

14. The projection device according to claim 1, wherein the lens component is a plane-convex lens that includes a first convex surface and a plane surface, the first convex surface faces toward the opening, and the plane surface faces toward the pattern lighting module.

15. The projection device according to claim 1, wherein the lens component is a biconvex lens that includes two second convex surfaces, the two second convex surfaces respectively face toward the opening and the pattern lighting module.

16. The projection device according to claim 15, wherein a curvature of each of the two second convex surfaces are between 0.025 and 0.05.

* * * * *